(12) United States Patent
Frank et al.

(10) Patent No.: US 8,269,184 B2
(45) Date of Patent: ***Sep. 18, 2012

(54) RADIATION DETECTOR DEVICE HAVING AN ELECTRICALLY CONDUCTIVE OPTICAL INTERFACE

(75) Inventors: John M. Frank, Hartville, OH (US); Peter R. Menge, Chagrin Falls, OH (US); Renee Gaspar, Middlefield, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/828,753

(22) Filed: Jul. 1, 2010

(65) Prior Publication Data

US 2011/0001054 A1    Jan. 6, 2011

Related U.S. Application Data

(63) Continuation-in-part of application No. 12/115,970, filed on May 6, 2008, now Pat. No. 8,039,806.

(51) Int. Cl.
*G01T 1/20* (2006.01)
(52) U.S. Cl. .................................. 250/370.11
(58) Field of Classification Search ................ 250/338.1
See application file for complete search history.

(56) References Cited

U.S. PATENT DOCUMENTS

| | | |
|---|---|---|
| 5,237,179 A | 8/1993 | Williams et al. |
| 5,742,057 A | 4/1998 | Frederick et al. |
| 5,796,109 A | 8/1998 | Frederick et al. |
| 5,846,513 A | 12/1998 | Carroll et al. |
| 6,015,974 A | 1/2000 | Genna |
| 6,315,926 B1 | 11/2001 | Jansen |
| 6,355,932 B1 | 3/2002 | Frederick |
| 6,459,085 B1 | 10/2002 | Chang et al. |
| 6,881,960 B2 | 4/2005 | Schreiner et al. |
| 7,420,162 B2 | 9/2008 | Wille et al. |
| 2002/0056809 A1 | 5/2002 | Frederick et al. |
| 2003/0034455 A1 | 2/2003 | Schreiner et al. |
| 2003/0213939 A1 | 11/2003 | Narayan et al. |
| 2004/0227097 A1* | 11/2004 | Brabec et al. ............ 250/370.12 |
| 2006/0002518 A1 | 1/2006 | Wille et al. |
| 2008/0265887 A1 | 10/2008 | Linz et al. |
| 2010/0066245 A1* | 3/2010 | Van Spijker .................. 313/532 |

OTHER PUBLICATIONS

International Search Report (2 pgs.).
Declaration Under 37 C.F.R. §1.132 for U.S. Appl. No. 12/115,970, signature dated Feb. 16, 2011, 3 pages.
Loctite 5404, Loctite Worldwide Design Handbook, <<http://loctite.fast.de/wwdh/us/p3325404.htm>>, dated Feb. 14, 2011, 2 pages.
Wacker SilGel 612, Wacker Silicones, Wacker SilGel, Wacker-Chemie GmbH, Version 3.00 from Sep. 2, 2004, 3 pages.

* cited by examiner

*Primary Examiner* — David Porta
*Assistant Examiner* — Djura Malevic
(74) *Attorney, Agent, or Firm* — Abel Law Group, LLP; Christopher J. Cianciolo

(57) ABSTRACT

A radiation detector device is disclosed and includes a scintillation device having a scintillator crystal. The radiation detector device also includes a photosensor. Further, the radiation detector device includes an optical interface coupled between the scintillation device and the photosensor. The optical interface is electrically conductive.

25 Claims, 8 Drawing Sheets

RADIATION DETECTOR DEVICE HAVING AN ELECTRICALLY CONDUCTIVE OPTICAL INTERFACE

RELATED APPLICATION

This application is a continuation-in-part of and claims priority under 35 U.S.C. § 120 to U.S. patent application Ser. No. 12/115,970 entitled "Radiation Detector Device Having an Electrically conductive Optical Interface" by Frank et al. filed May 6, 2008, now, U.S. Pat. No. 8,039,806, which is assigned to the current assignee hereof.

FIELD OF THE DISCLOSURE

The present disclosure is directed to radiation detector devices, particularly scintillation devices for industrial applications.

BACKGROUND

Radiation detector devices are used in a variety of industrial applications. For example, scintillation detectors are used for well logging in the oil and gas industry. Typically, scintillation detectors have scintillator crystals made of an activated sodium iodide or other material that is effective for detecting gamma rays. Generally, the scintillator crystals are enclosed in casings or sleeves that include a window to permit radiation-induced scintillation light to pass out of the crystal package. The light passes to a light-sensing device such as a photomultiplier tube, and the photomultiplier tube converts the light photons emitted from the crystal into electrical pulses. The electrical pulses are shaped and digitized by associated electronics and may be registered as counts that are transmitted to analyzing equipment.

Scintillation detectors are useful for well logging, because the measurement of radiation, such as gamma rays and neutrons, allows users to analyze rock strata that surround a bore hole. Scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock. Vibration and shock can cause the scintillator crystal, casing materials, the window, other elements of the scintillation device, or any combination thereof, to fail or otherwise malfunction.

Accordingly, the industry continues to need improvements in scintillation devices, particularly durable, ruggedized scintillation devices that can withstand the harsh environments of industrial applications.

SUMMARY

In a particular embodiment, a radiation detector device is disclosed and includes a scintillation device having a scintillator crystal. The radiation detector device also includes a photosensor. Further, the radiation detector device includes an optical interface coupled between the scintillation device and the photosensor. The optical interface is electrically conductive.

In another embodiment, a radiation detector device is disclosed and includes a scintillation device including a scintillator crystal and at least one stabilizing mechanism adapted to apply a total stabilization pressure of less than approximately 100 psi to the scintillator crystal. The radiation detector device also includes a photosensor. Further, the radiation detector device includes an optical interface coupled between the scintillation device and the photosensor. The radiation detector device also includes a photon counter device adapted to count photons emitted by the scintillator crystal based on electrical pulses received from the photosensor, where the electrical pulses output by the photosensor based on photons received at the photosensor from the scintillation device. Counts per second recorded by the photon counter, when vibrational frequencies of from approximately 50 Hz to approximately 1450 Hz are applied to the radiation detector device, average less than or equal to 116% of an average background value.

In a further embodiment, a method of applying an electrically conductive coating to silicone rubber is disclosed. The method includes at least partially coating a surface of a polished substrate with an electrically conductive polymer. The method also includes applying an uncured mixture of silicone rubber and curing agent to the at least partially coated surface. Further, the method includes curing the silicone rubber. The method also includes detaching the cured silicone rubber from the substrate, where the electrically conductive polymer is disposed on a surface of the detached, cured silicone rubber.

In a further embodiment, an article comprising cured silicone rubber is disclosed and has a plurality of surfaces. An electrically conductive polymer material at least partially coats at least one of the plurality of surfaces, and the article is characterized by a surface resistivity of less than $10^{15}$ ohm-cm.

In another embodiment, an optical interface adapted to be used in a radiation detector device is disclosed and includes a plurality of surfaces. An electrically conductive coating is disposed on at least one of the plurality of surfaces. The optical interface is characterized by a surface resistivity of less than $10^{15}$ ohm-cm.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems or methods. Moreover, some statements may apply to some inventive features but not to others.

Figure 1:
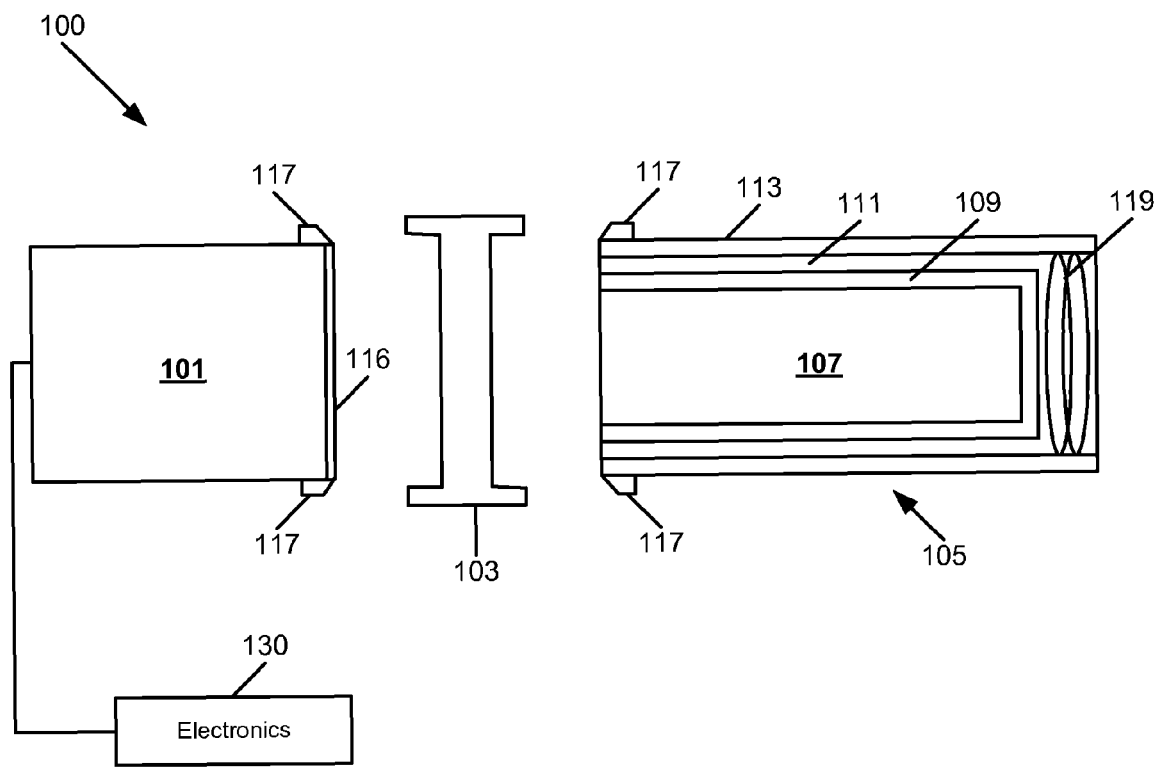
FIG. 1 is an illustration of a particular embodiment of a radiation detector device.

FIG. 1 shows a particular embodiment of a radiation detector device 100. The radiation detector device 100 includes a photosensor 101, an optical interface 103, and a scintillation device 105. Though the photosensor 101, the optical interface 103, and the scintillation device 105 are illustrated separate from each other, it is to be understood that the photosensor 101 and the scintillation device 105 are each adapted to be coupled to the optical interface 103, with the optical interface 103 disposed between the photosensor 101 and the scintillation device 105. In one embodiment, the scintillation device 105 and the photosensor 101 can be coupled to the optical interface 103 using biasing members 117 that provide a resiliency that facilitates the absorption of shocks to the detector 100. The biasing members 117 can be used in conjunction with other known coupling methods such as the use of an optical gel or bonding agent.

In one embodiment, the photosensor 101 comprises a device capable of spectral detection and resolution. For example, the photosensor 101 can comprise a conventional photomultiplier tube (PMT) or a hybrid photosensor. The photosensor 101 is adapted to receive photons emitted by the scintillation device 105, other sources, or a combination thereof, via an input window 116, and the photosensor 101 is adapted to produce electrical pulses based on numbers of photons that it receives. The electrical pulses can be shaped and digitized by associated electronics 130 to provide a count of the photons received at the photosensor 101. The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting the photosensor 101, the electronics 130, or a combination thereof, such as a metal, metal alloy, other material, or any combination thereof.

The scintillation device 105 includes a scintillator crystal 107. The scintillator crystal 107 is substantially surrounded by a reflector 109. In one embodiment, the reflector 109 can include polytetrafluoroethylene (PTFE), another material adapted to reflect light emitted by the scintillator crystal 107, or a combination thereof. In an illustrative embodiment, the reflector 109 can be substantially surrounded by a shock absorbing member 111. The scintillator crystal 107, the reflector 109, and the shock absorbing member 111 can be housed within a casing 113.

The scintillation device 105 includes at least one stabilization mechanism adapted to reduce relative movement between the scintillator crystal 107 and other elements of the radiation detector device 100, such as the optical interface 103, the casing 113, the shock absorber 111, the reflector 109, or any combination thereof. The stabilization mechanism(s) may include a spring 119, other stabilization mechanism(s), or a combination thereof. The stabilization mechanism(s) can be adapted to apply lateral forces, horizontal forces, or a combination thereof, to the scintillator crystal 107 to stabilize its position relative to one or more other elements of the radiation detector device 100. Preferably, the total pressure applied to the scintillator crystal 107 is less than approximately 100 psi, such as a pressure of from approximately 20 psi to approximately 60 psi.

As illustrated, the optical interface 103 is adapted to be coupled between the photosensor 101 and the scintillation device 105. The optical interface 103 is also adapted to facilitate optical coupling between the photosensor 101 and the scintillation device 105. The optical interface 103 can include a polymer, such as a silicone rubber, that is polarized to align the reflective indices of the scintillator crystal 107 and the input window 116. In other embodiments, the optical interface 103 can include gels or colloids that include polymers and additional elements.

When silicone rubber is included in the optical interface 103, the silicone rubber typically includes long cross-linked molecules that can be polarized to optically couple the scintillator crystal 107 with the input window 116. For example, the optical interface 116 can include polymerized silicone rubber having less than or equal to 1.0% mass loss under vacuum baking governed by ASTM test method E595. More preferably, the optical interface 116 can include polymerized silicone rubber having less than or equal to 0.5% mass loss under vacuum baking governed by ASTM test method E595. The molecular characteristics and susceptibility to polarization that characterize the silicone rubber can also predispose the silicone rubber to static buildup that results from relative movement of the optical interface 103 and the scintillation device 105, the photosensor 101, or a combination thereof.

Figure 3:
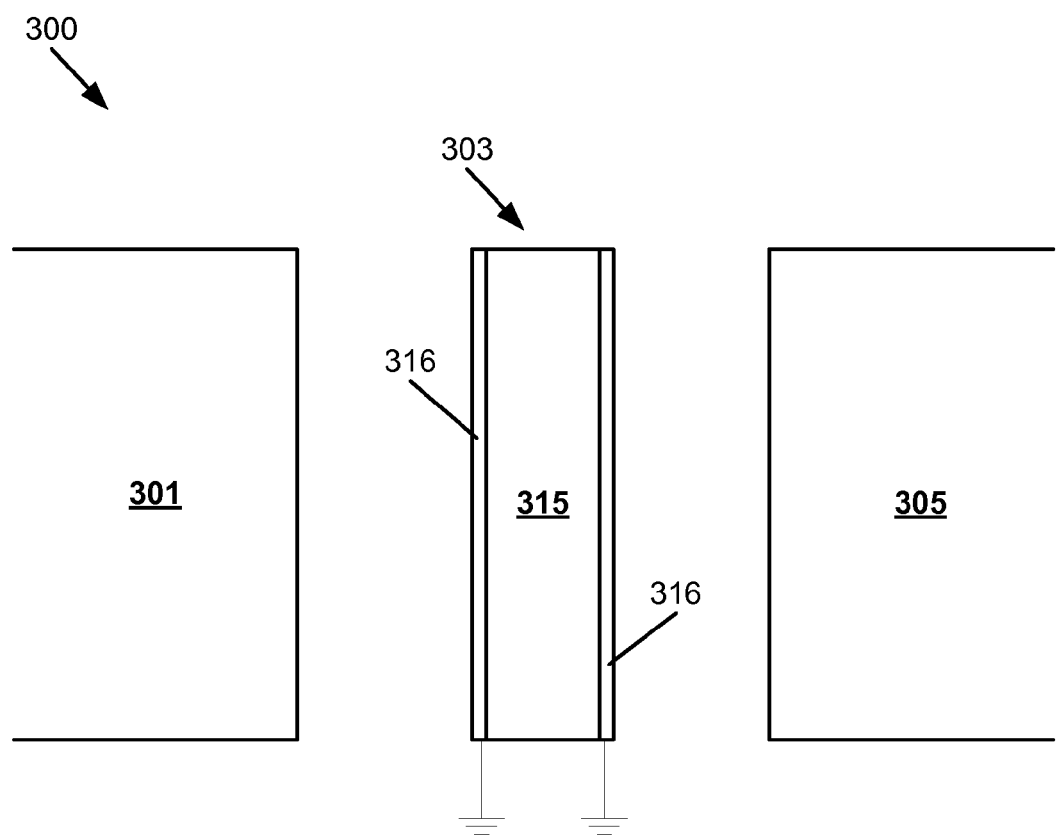
FIG. 3 is an illustration of a second particular embodiment of a radiation detector device.

The optical interface 103 is adapted to reduce static discharge via electrical conductivity. For example, the optical interface 103 can be characterized by a surface resistivity of less than approximately $10^{15}$ ohm-cm, such as less than or equal to approximately $10^9$ ohm-cm or less than or equal to approximately $10^3$ ohm-cm. The optical interface 103 comprises a polymer and a conductor. The conductor can be an electrically conductive coating, an electrically conductive coupled feature, or a combination thereof. In one embodiment, the optical interface comprises silicone rubber at least partially coated with an electrically conductive coating that is transparent or translucent. An example of an optical interface at least partially coated with an electrically conductive coating is illustrated in FIG. 3. The electrically conductive coating can include a polymer. For instance, the electrically conductive coating can include poly(3,4-ethylenedioxythiophene) (PEDOT). The electrically conductive coating can be applied to the silicone rubber as described with reference to FIG. 5. In another embodiment, the electrically conductive coating can include graphene. Graphene is a sheet of sp2-bonded carbon atoms that are densely packed in a honeycomb crystal lattice. The graphene coating can have a thickness as low as a single atom thick, but graphene may be deployed in the form of multiple graphene layers. While the graphene layer is typically a conformal, continuous layer, in another embodiment, it can be deployed as a discontinuous layer including holes, gaps, overlapping portions, or the like. Further, the graphene may be applied as a graphene lattice, which may have a repeating pattern, such as first and second arrays of parallel graphene strips, the first and second arrays being oriented perpendicular to each other, or oriented another non-parallel angle (e.g., 45 degrees). In one embodiment, the array can generally be characterized as having discontinuous regions that are devoid of graphene material (e.g., voids between graphene strips), those regions optionally forming a repeating pattern.

In another embodiment, an electrically conductive coupled feature can include a conductor that comprises a metallic material, such as a wire article, which contacts or is integrated with the optical interface 103. For example, a wire mesh can contact or be integrated with the optical interface 103. An example embodiment of an optical interface incorporating a wire mesh is illustrated in FIGS. 4B-4D. In one embodiment, a surface of the optical interface at least partially contacts the scintillation device 105. For example, the optical interface 103 can include silicone rubber that extends through gaps in the wire mesh to contact the scintillator crystal 107 or an output window of the scintillation device 105 that is disposed between the scintillator crystal 107 and the optical interface 103. In one embodiment, the wire mesh can contact the scintillator crystal 107, and the force of the spring 119 can cause the scintillator crystal 107 to push the wire mesh into the optical interface 103 a sufficient distance to create an optical coupling between the scintillator crystal 107 and the optical interface 103.

In other embodiments, the optical interface 103 can be formed of electrically conductive material, such as an electrically conductive silicone material characterized by a surface resistivity of less than approximately $10^{15}$ ohm-cm, or an electrically conductive epoxy material characterized by a surface resistivity of less than approximately $10^{15}$ ohm-cm.

In one embodiment, the optical interface 103 is adapted to be held at ground potential. For example, the optical interface 103 can be coupled to the casing 113 or a path to the casing 113. In another embodiment, the optical interface 103 can be ungrounded, such that the conductor reduces or prevents static discharge by lowering charge density.

Figure 2A:
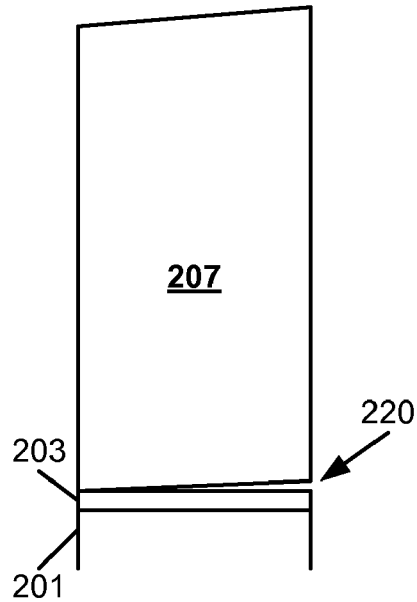
FIGS. 2A-2C are illustrations of various embodiments of aspects of radiation detector devices.
Figure 2B:
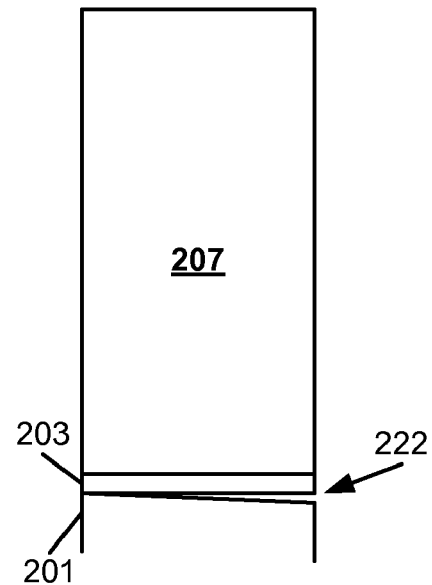
Figure 2C:
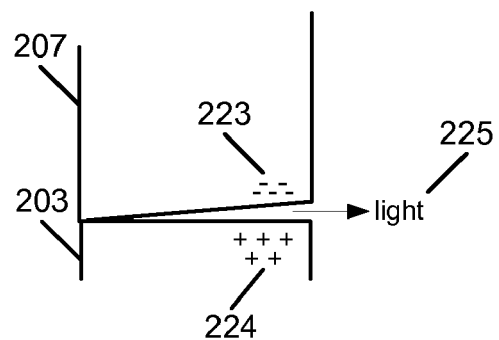

FIGS. 2A-2C show various embodiments of aspects of a radiation detector device. FIG. 2A shows a scintillation device 205 interfaced to a photosensor 201 via an optical interface 203. In one example, a scintillator crystal can be interfaced to an input window of the photosensor 201. In another example, an output window of the scintillation device 205 can be interfaced to an input window of the photosensor 201. The scintillation device 205 and the optical interface 203 can be separated for short periods of time due to vibration or shock, causing a temporary gap 220. As shown in FIG. 2B, the photosensor 201 and the optical interface 203 can be temporarily separated due to such vibration or shock, causing another gap 222.

As illustrated in FIG. 2C, relative movement between the optical interface 203 and the scintillation device 205 (or between the optical interface 203 and a photosensor) can cause one material to remove charge from the other. The resulting regions of charge 223 and 224 create an electrical potential. If relative movement continues, the electrical potential can become large enough to create a static discharge. The static discharge can produce light 225, such as visible or ultraviolet light, that is detected by a photosensor, such as the photosensor 101 illustrated in FIG. 1. Further, ultraviolet light can stimulate the production of unwanted scintillation light in the scintillator. The detection of the light 225 results in spurious photon counts that are difficult to distinguish from scintillation light produced by the scintillation device 205 in response to gamma rays or other radiation.

FIG. 3 is an illustration of a second particular embodiment of a radiation detector device 300. The radiation detector device 300 includes a photosensor 301, an optical interface 303, and a scintillator device 305. The optical interface 303 is adapted to be coupled between the photosensor 301 and the scintillation device 305. Further, the optical interface 303 is electrically conductive. For instance, the optical interface 303 can be characterized by a surface resistivity of less than approximately $10^{15}$ ohm-cm, such as less than or equal to approximately $10^9$ ohm-cm or less than or equal to approximately $10^3$ ohm-cm. In the embodiment illustrated in FIG. 3, the optical interface 303 comprises a transparent or translucent substrate 315, such as silicone rubber, which is adapted to be polarized to optically couple, for example, a scintillator crystal of the scintillation device 305 with an input window of the photosensor 301. In addition, the optical interface 303 comprises an electrically conductive coating 316 that at least partially coats one or more surfaces of the substrate 315. The electrically conductive coating 316 is transparent or translucent and may or may not be held at ground potential.

In one embodiment, the electrically conductive coating 316 comprises an organic material, such as a polymer. For example, the electrically conductive coating 316 can include poly(3,4-ethylenedioxythiophene) (PEDOT). In one embodiment, the electrically conductive coating 316 can be characterized by an average thickness, on each surface of the substrate 315, of from approximately 0.5 µm to approximately 4 µm. In another embodiment, the electrically conductive coating 316 can be characterized by an average thickness on each surface of the substrate that is from approximately 0.03% to approximately 0.25% of a thickness of the substrate. In yet another embodiment, the electrically conductive coating 316 comprises one or more graphene layers.

Figure 4A:
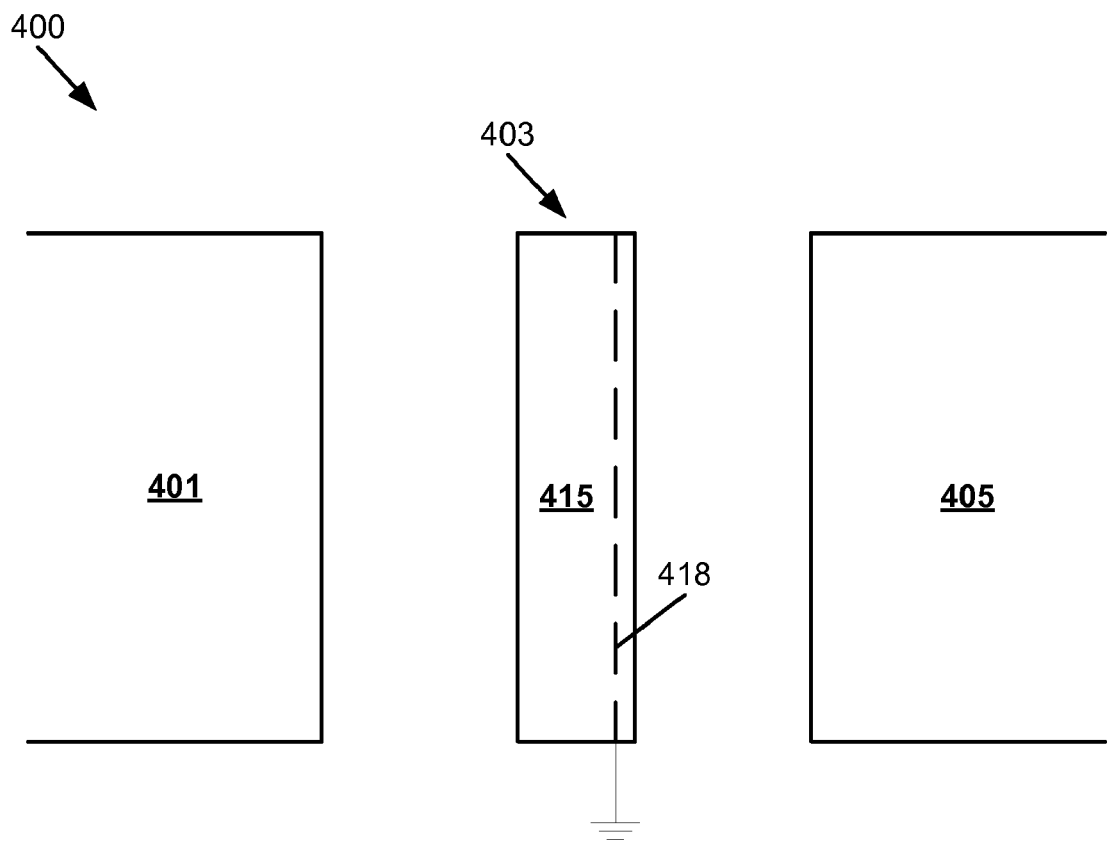
FIGS. 4A-4D are illustrations of a third particular embodiment of a radiation detector device.
Figure 4B:
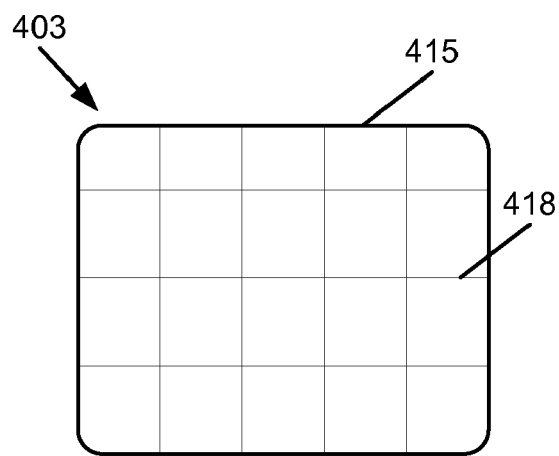
Figure 4C:
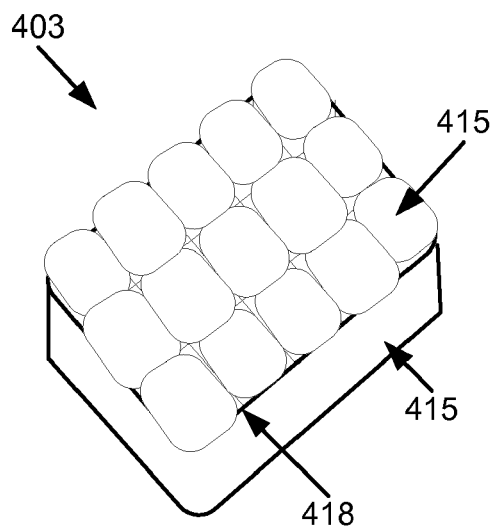
Figure 4D:
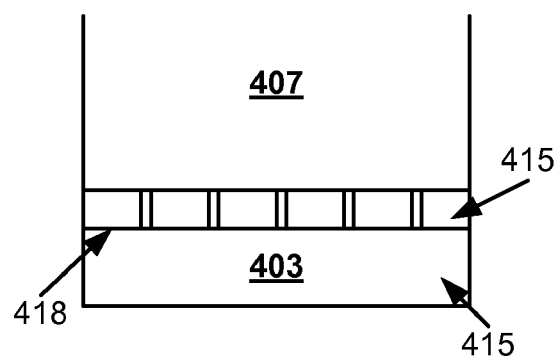

FIGS. 4A-4D are illustrations of a third particular embodiment of a radiation detector device 400. Referring to FIG. 4A, the radiation detector device 400 includes a photosensor 401, an optical interface 403, and a scintillator device 405. The optical interface 403 is adapted to be coupled between the photosensor 401 and the scintillation device 405. Further, the optical interface 403 is electrically conductive. For instance, the optical interface 303 can be characterized by a surface resistivity of less than approximately $10^{15}$ ohm-cm, such as less than or equal to approximately $10^9$ ohm-cm or less than or equal to approximately $10^3$ ohm-cm. In the embodiments illustrated in FIGS. 4A-4D, the optical interface 403 includes a transparent or translucent material 415 that is adapted to optically couple the photosensor 401 and the scintillator device 405. In addition, the optical interface 403 includes a metallic material 418 that may or may not be adapted to be held at ground potential.

For example, the optical interface 403 can include a wire article, such as the wire mesh shown in FIG. 4B. In one embodiment, a surface of the transparent or translucent material 415 at least partially contacts the scintillation device 405, and the wire mesh does not contact the scintillation device 405. For example, as shown in FIGS. 4C-4D, the transparent or translucent material 415 can include silicone rubber that extends through gaps in the wire mesh to contact the scintillation device 405. Preferably, the wire mesh is sufficiently fine to allow light to pass through the optical interface 403. For example, the wire mesh can be characterized by an average wire diameter of 10 µm-50 µm, such as 20 µm-30 µm. Further, each gap in the wire mesh can be characterized by an average size of from approximately 250 µm to approximately 750 µm, such as from approximately 450 µm to approximately 550 µm. In a particular embodiment, the wire mesh can be characterized by an average wire diameter of approximately 25 µm, and each gap in the wire mesh can be characterized by an average size of approximately 480 µm.

Figure 5:
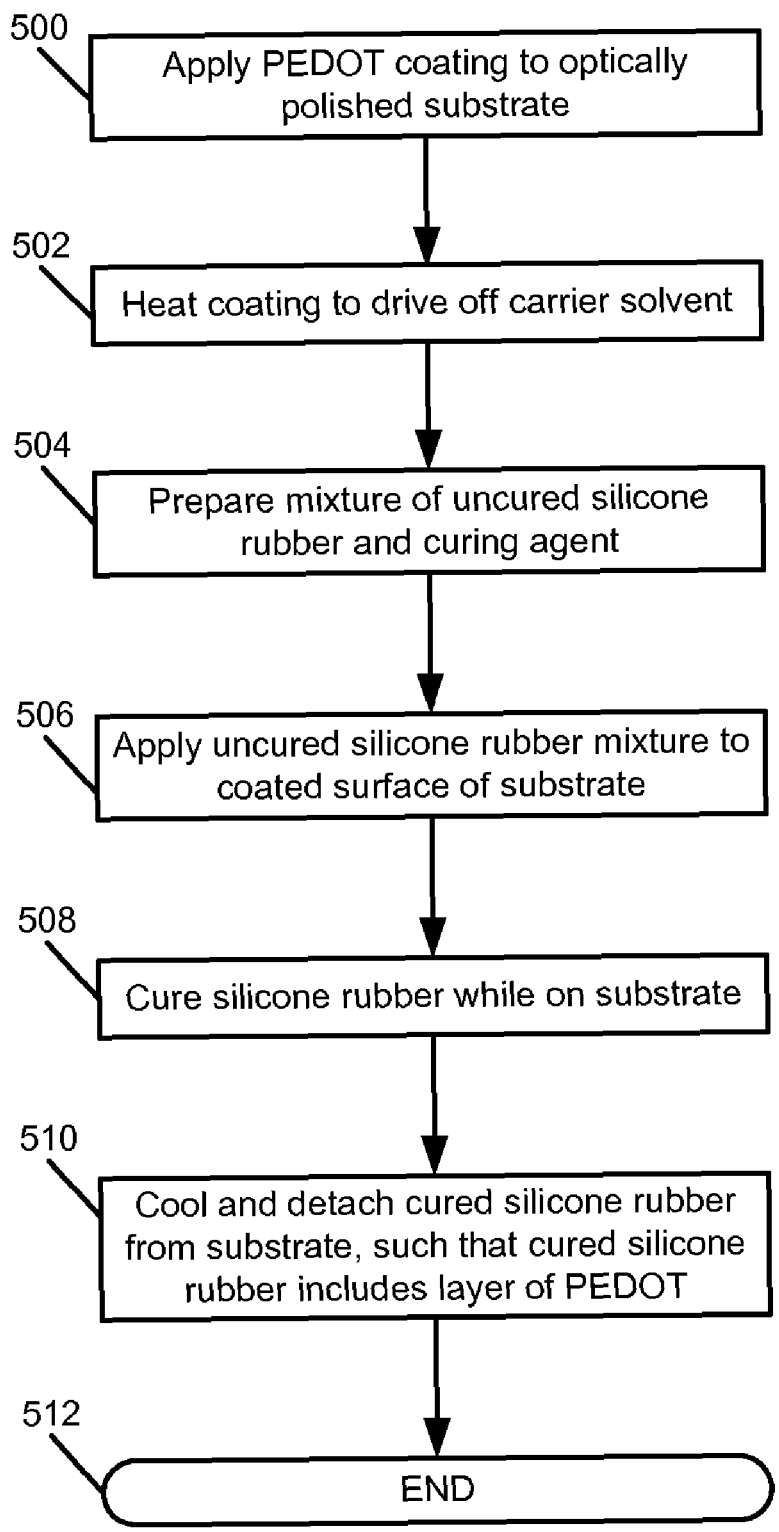
FIG. 5 is a flow diagram illustrating a particular embodiment of a method of applying an electrically conductive coating to silicone rubber.

FIG. 5 is a flow diagram illustrating a particular embodiment of a method of applying an electrically conductive coating to silicone rubber. The method can be used to apply an electrically conductive coating, such as a transparent or translucent electrically conductive polymer, to silicone rubber used in radiation detection devices, organic light-emitting diodes (LEDs), organic visual displays, organic opto-electronic devices (e.g., one or more solar cells or one or more Pockels cells), other organic devices, other inorganic devices, or any combination thereof. Though the method is described with reference to at least partially coating a surface of silicone rubber with poly(3,4-ethylenedioxythiophene) (PEDOT), other electrically conductive polymers can be used.

At block 500, a coating of PEDOT is applied to a surface of a clean, polished substrate. For example, the substrate surface can be polished to an average root-mean-square roughness of less than approximately 2 μm rms. In another example, the substrate surface can be polished to an average root-mean-square roughness of less than approximately 500 nm. Preferably, the substrate comprises glass, though other substrates may be used, such as substrates that comprise a plastic material and that are susceptible of optical polishing.

The PEDOT can be applied to the surface of the substrate via spraying, spinning, brushing, dipping, printing, rolling, another method, or any combination thereof. In one embodiment, the coating is applied to the surface of the substrate with an average thickness that is desired to coat a surface of silicone rubber. In another embodiment, the coating is applied to the surface of the substrate with an average thickness that is greater than that desired to coat the surface of the silicone rubber. In a further embodiment, the electrically conductive polymer is applied to the substrate in a pattern, such as one or more dots, one or more lines, or a combination thereof. For example, the polymer can be sprayed onto the substrate through a patterned mask.

Moving to block 502, the substrate is heated to remove carrier solvent associated with the PEDOT. The solvent can be an inorganic solvent, such as water; an organic solvent, such as isopropyl alcohol, polyvinyl alcohol, another organic solvent, or any combination thereof; or a combination of organic and inorganic solvents. Proceeding to block 504, a mixture of uncured silicone rubber and curing agent (e.g., a vulcanizer or cross-linker) is prepared. In other embodiments, an RTV (room temperature vulcanization) silicone rubber that uses humidity to cure can be prepared.

Continuing to block 506, the silicone rubber mixture is applied to the coated surface of the substrate before the silicone rubber is cured. In one embodiment, a plastic ring or other article adapted to not adhere to the uncured or cured silicone rubber may be used to hold the mixture in place on the substrate.

Advancing to block 508, the silicone rubber is cured while on the substrate. At block 510, the cured silicone rubber is cooled and detached from the substrate. The cured silicone rubber includes a layer of the PEDOT and may include all or a portion of the PEDOT initially applied to the substrate. In some embodiments, the layer of PEDOT can be polished and smoothed to a level surface.

In some embodiments, PEDOT coatings can be applied to surfaces of multiple substrates, and the uncured silicone rubber mixture can be disposed between the coated substrates, such that multiple surfaces of the cured silicone rubber include the PEDOT after detachment from the substrates.

In an alternate embodiment, the silicone rubber mixture is applied to a graphite substrate before the silicone rubber is cured. In one embodiment, a plastic ring or other article adapted to not adhere to the uncured or cured silicone rubber may be used to hold the mixture in place on the substrate. The silicone rubber can be cured while on the graphite substrate, and cooled and detached from the graphite substrate, thereby leaving behind one or more layers of graphene on the cured silicone rubber. In some embodiments, the uncured silicone rubber mixture can be disposed between multiple substrates, such that multiple surfaces of the cured silicone rubber include one or more graphene layers after detachment from the substrates.

EXAMPLE

In one example, 0.15 mL of Baytron® F CPP 105DM was painted onto a surface of a polished glass blank, while spinning on a lazy suzanne. Once dry, the coated glass blank was heated in an oven for approximately 30 minutes at approximately 80° C. The substrate was then removed from the oven and cooled. A clear silicone rubber (Wacker Elastosil® RT601) was mixed with curing agent in a ratio of 10:1. The mixture was vacuum pumped to a pressure of 50 mTorr and held at that pressure for 20 minutes to remove absorbed gases. The mixture was applied to a thickness of 1.5 mm on the coated surface of the glass blank and was held in place using a plastic ring. The silicone rubber was cured by baking at approximately 60° C. for approximately 150 minutes. The cured silicone rubber was then cooled, and the optical interface was peeled from the glass blank. The coating of Baytron® F PVA peeled off the glass blank and was adhered to a surface of the cured silicone rubber.

Figure 6:
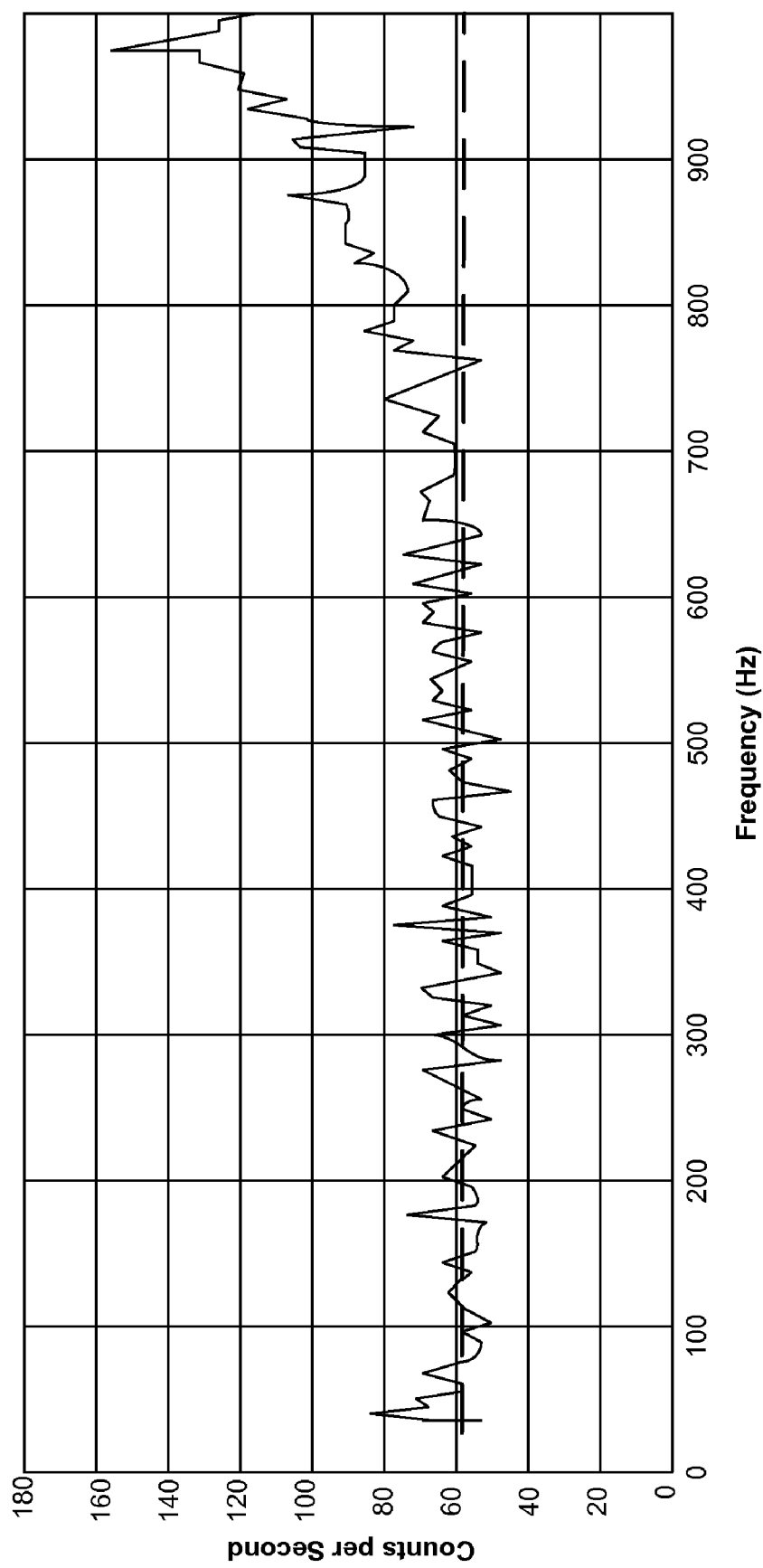
FIG. 6 is a plot illustrating numbers of counts recorded by a radiation detector device as vibration increases.
Figure 7:
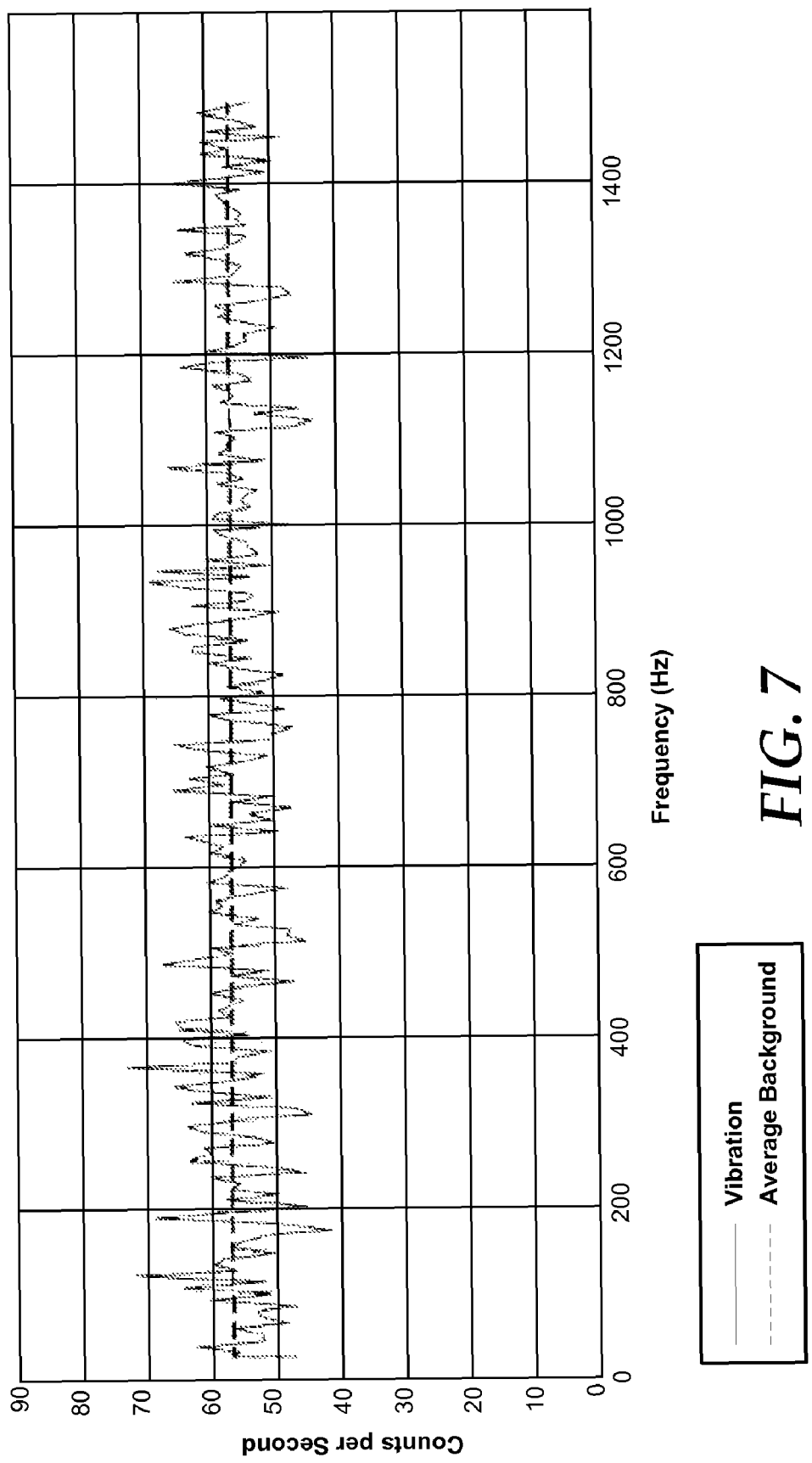
FIG. 7 is a second plot illustrating numbers of counts recorded by a radiation detector device as vibration increases.

FIGS. 6-7 show the results of vibrational testing of radiation detector devices. Testing was performed using a scintillation detector having a cylindrical NaI(Tl) crystal with a diameter of approximately 4.5 cm and a length of approximately 10 cm. The crystal was wrapped with a PTFE reflector and inserted into a ribbed silicone rubber sleeve. This crystal/PTFE/sleeve assembly was inserted in an inconel housing having an inner diameter of approximately 4.9 cm and an outer diameter of approximately 5 cm. The crystal was wetted to a glass window having a thickness of approximately 0.3 cm, using a pad of clear silicone rubber that was 0.2 cm thick. The crystal was held against the silicone rubber pad using 2 concentric springs. The unit was evacuated to a pressure of 50 mTorr, and then filled with 1 atmosphere of argon. A stainless steel end cap was welded on in the argon atmosphere to make the detector hermetic.

The detector was then subjected to a vibration test to detect spurious counts caused by static discharge between the silicone rubber pad and the crystal, or between the silicone rubber pad and the window. The detector was secured to a vibration table (Ling Dynamic Systems, model V810-240, controlled by a LDS Dactron Control). A photomultiplier tube (Hamamatsu R1288-32 at 1200 V) was optically coupled to the glass window of the detector. Signals from the photomultiplier were run through a pre-amplifier (Canberra model 2005) and then to a multichannel analyzer (Aptec model S5008) for tallying any light pulses from the scintillator that were greater than the equivalent of the light generated by a 20 keV gamma ray. The vibration table was programmed to create a sweep of vibrational frequencies of from approximately 50 to approximately 1000 Hz at a rate of 6.47 Hz/s, with a peak acceleration of approximately 30 g (905 ft/s$^2$). The results of this test are shown in FIG. 6.

Subsequently, the end cap was cut off, and the silicone rubber pad was replaced with a conductive optical interface comprising silicone rubber with a PEDOT coating. The end cap was welded back on, and a new vibration test was run with substantially the same parameters as described above, except that the vibration table was programmed to create a sweep of vibrational frequencies from approximately 50 Hz to approximately 1450 Hz. The results are shown in FIG. 7.

FIG. 6 is a plot illustrating photon counts recorded by a photon counter communicating with a photosensor in a radiation detector device that includes argon gas at 1 atm, as vibration increases. The plot shows recorded photon counts per second in relation to vibrational frequencies applied to the radiation detector device. The plot shows that, as the frequency of vibration increased, particularly as the vibration surpassed approximately 720 Hz, all counts per second values recorded by the photon counter were greater than the average background. Hence, as vibrational frequency surpassed approximately 720 Hz, spurious counts attributable to such vibration resulted in greater inaccuracies in count measurements. Notably, counts per second experience their largest deviation from both the overall average counts per second and the average background, when the vibrational frequency is within a certain range of a resonance frequency of the radiation detector device, such as from 950 Hz to 1000 Hz. As shown, counts per second at approximately 1000 Hz were greater than 200% of the average background.

FIG. 7 is a second plot illustrating photon counts recorded by a photon counter in a radiation detector device that includes a silicone rubber optical interface coated with PEDOT, as vibration increases. The plot shows an average background of 56.7 cps and an average of 55.7 cps under vibration. The plot demonstrates that the average counts per second was less than approximately 116.0% of the average background when vibrational frequencies from 50 Hz to 1450 Hz were applied to the radiation detector device. For instance, the plot shown in FIG. 7 illustrates that the average counts per second did not increase due to vibration from 50 Hz to 1450 Hz, when the radiation detector device included the PEDOT-coated optical interface. Additionally, the average vibration-induced counts per second was within approximately 2.0% of the average background.

Moreover, the counts per second at vibrational frequencies greater than approximately 780 Hz did not remain higher than the average background or the average counts per second from 50 Hz to 1450 Hz. Rather, the photon counter recorded at least one counts per second value that was less than approximately 116.0% of the average background value. Further, counts per second do not experience the deviation shown in FIG. 6, when the vibrational frequency is within a certain range of a resonance frequency of the radiation detector device, such as from 900 Hz to 1000 Hz. As shown, counts per second at approximately 1000 Hz were less than 200% of the average background and less than 150% of the overall average counts per second. In fact, the plot shown in FIG. 7 demonstrates that counts per second were within 20% of the average background and the overall average counts per second when vibrational frequency applied to the radiation detector was between 900 Hz and 1000 Hz.

Further, a peak counts per second recorded by the photon counter, when vibrational frequencies of from approximately 50 Hz to approximately 1450 Hz were applied to the radiation detector device, was less than 200% of the average background value. As shown, the counts per second value peak was less than 150% of the average background value. In fact, the counts per second value peak was less than 125% of the average background value.

Prior art in the field of scintillation devices recognizes that static electricity may develop due to relative movement between scintillator crystals and other elements of a scintillation device. Conventional solutions to static discharge include attempts to better stabilize the scintillator crystal with respect to other elements of the scintillation device, by placing greater compressive forces on the crystal, the other elements, or a combination thereof. Other approaches attempt to prevent static discharge by placing silicone grease or oil between elements of the scintillator device.

Use of electrically conductive optical interfaces to prevent or reduce static discharge has the added benefit of allowing lower forces to be applied to springs or other stabilization mechanisms that hold the scintillator crystal in place, as relative movement between the scintillator crystal and other elements of the scintillation device due to vibration and shock need not be prevented altogether. For instance, a pressure of less than approximately 100 psi, such as a pressure of from approximately 20 psi to approximately 60 psi, can be applied to the scintillator crystal to hold it substantially in position; whereas, a pressure of greater than 150 psi, such as a pressure of 200 psi, can be required to reduce static discharge by attempting to immobilize the crystal. Application of lower forces to the scintillator crystal can reduce scintillator crystal deformity and breakage, allow the use of larger scintillator crystals, make assembly of the scintillation device easier, and contribute to other advantages. In addition, springs and other stabilization mechanisms can fail as G-load increases. For instance, springs can begin to fail once G-load surpasses 30 G, such as in a 40 G-50 G range. Further, electrically conductive optical interfaces do not present problems of leakage, containment, bubbling or degradation seen with the use of silicone oil or grease, particularly at high temperatures.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A radiation detector device, comprising:
   a scintillation device including a scintillator crystal;
   a photosensor; and
   an optical interface coupled between the scintillation device and the photosensor, wherein the optical interface is electrically conductive.

2. The radiation detector device of claim 1, wherein the optical interface have a surface resistivity of less than or equal to approximately $10^9$ ohm-cm.

3. The radiation detector device of claim 1, wherein the optical interface is electrically grounded.

4. The radiation detector device of claim 1, wherein the optical interface comprises a polymer and a conductor.

5. The radiation detector device of claim 4, wherein the conductor includes at least one of an electrically conductive coating or an electrically conductive coupled feature.

6. The radiation detector device of claim 5, wherein the optical interface comprises a transparent or translucent substrate and wherein at least one surface of the substrate is at least partially coated with the electrically conductive coating.

7. The radiation detector device of claim 6, wherein the electrically conductive coating includes a polymer.

8. The radiation detector device of claim 7, wherein the electrically conductive coating comprises poly(3,4-ethylene-dioxythiophene).

9. The radiation detector device of claim 6, wherein the electrically conductive coating includes a graphene layer.

10. The radiation detector device of claim 9, wherein the electrically conductive coating includes more than one graphene layer.

11. The radiation detector device of claim 5, wherein the electrically conductive coupled feature comprises a metallic material.

12. The radiation detector device of claim 11, wherein the metallic material comprises a wire article integrated with the optical interface.

13. The radiation detector device of claim 12, wherein the wire article comprises a wire mesh.

14. A radiation detector device, comprising:
a scintillation device including a scintillator crystal and at least one stabilizing mechanism, wherein the at least one stabilization mechanism is adapted to apply a total stabilization pressure of less than approximately 100 psi to the scintillator crystal;
a photosensor; and
an optical interface coupled between the scintillation device and the photosensor, wherein the optical interface includes a transparent or translucent substrate, and wherein at least one surface of the substrate is at least partially coated with an electrically conductive coating, the electrically conductive coating having a surface resistivity of less than approximately $10^9$ ohm-cm;
a photon counter device adapted to count photons emitted by the scintillator crystal based on electrical pulses received from the photosensor, the electrical pulses output by the photosensor based on photons received at the photosensor from the scintillation device;
wherein the photon counter is adapted to record counts per second that would average less than or equal to 116% of an average background value when vibrational frequencies of from approximately 50 Hz to approximately 1450 Hz would be applied to the radiation detector device at a load of less than or equal to approximately 30 G.

15. The radiation detector device of claim 14, wherein a peak counts per second recorded by the photon counter, when the vibrational frequencies of from approximately 50 Hz to approximately 1450 Hz are applied to the radiation detector device, is less than 200% of the average background value.

16. The radiation detector device of claim 14, wherein a peak counts per second value recorded by the photon counter, when the vibrational frequencies applied to the radiation detector device are within a range of a resonance frequency of the radiation detector device, are less than or equal to 200% of the average background value.

17. The radiation detector device of claim 16, wherein the resonance frequency is approximately 975 Hz.

18. The radiation detector device of claim 17, wherein the range is from 900 Hz to 1000 Hz.

19. The radiation detector device of claim 14, wherein counts per second recorded by the photon counter, when the vibrational frequencies applied to the radiation detector device are within a range of a resonance frequency of the radiation detector device, do not vary from the average background value by more than approximately 20.0%.

20. The radiation detector device of claim 14, wherein the electrically conductive coating on each surface of the substrate has an average thickness that is from approximately 0.03% to approximately 0.25% of a thickness of the substrate.

21. The radiation detector device of claim 14, wherein the electrically conductive coating includes a graphene layer.

22. The radiation detector device of claim 21, wherein the electrically conductive coating includes more than one graphene layer.

23. An optical interface adapted to be used in a radiation detector device, the optical interface comprising:
a plurality of surfaces; and
an electrically conductive coating disposed on at least one of the plurality of surfaces;
wherein the optical interface comprises a graphene layer and has a surface resistivity of less than $10^9$ ohm-cm.

24. The optical interface of claim 23, wherein the optical interface comprises a polymer.

25. The optical interface of claim 23, wherein the optical interface comprises a cured silicone rubber.

* * * * *